US008830979B2

(12) United States Patent
Minapalli et al.

(10) Patent No.: US 8,830,979 B2
(45) Date of Patent: Sep. 9, 2014

(54) WIRELESS MULTIPOINT VOICE NETWORK

(75) Inventors: Rohini Minapalli, Torrance, CA (US); Tod Edward Gentille, Torrance, CA (US); David Jacobs, Rolling Hills, CA (US); Jeffrey Alan Paul, Torrance, CA (US); Jonathan A. Watkins, Torrance, CA (US); Shawn Pasternak, Long Beach, CA (US)

(73) Assignee: Anchor Audio, Inc., Torrance, CA (US)

( * ) Notice: Subject to any disclaimer, the term of this patent is extended or adjusted under 35 U.S.C. 154(b) by 0 days.

(21) Appl. No.: 12/758,578

(22) Filed: Apr. 12, 2010

(65) Prior Publication Data

US 2010/0322210 A1    Dec. 23, 2010

Related U.S. Application Data

(63) Continuation-in-part of application No. 11/759,173, filed on Jun. 6, 2007, and a continuation-in-part of application No. 11/066,798, filed on Feb. 25, 2005, now Pat. No. 7,761,107.

(51) Int. Cl.
*H04B 7/208* (2006.01)
*H04W 72/04* (2009.01)
*H04L 5/00* (2006.01)

(52) U.S. Cl.
CPC ......... *H04W 72/0493* (2013.01); *H04L 5/0044* (2013.01)
USPC ........... 370/344; 455/517; 455/518; 455/519; 455/426; 455/446; 370/347

(58) Field of Classification Search
USPC ...................... 455/517–519, 426, 550.1, 446; 370/344, 347
See application file for complete search history.

(56) References Cited

U.S. PATENT DOCUMENTS

| 5,781,860 | A  | * | 7/1998 | Lopponen et al. | ......... | 455/426.1 |
| 6,321,095 | B1 | * | 11/2001 | Gavette | ......... | 455/517 |
| 6,882,856 | B1 | * | 4/2005 | Alterman et al. | ......... | 455/519 |

(Continued)

FOREIGN PATENT DOCUMENTS

| EP | 1 564 943 A1 | 8/2005 |
| EP | 1564943 A1 * | 8/2005 | ............. H04L 12/56 |

OTHER PUBLICATIONS

IEC:TDMA Tutorial :Index, http://www.webproforum/iec07/full.html.*

*Primary Examiner* — Charles Shedrick
(74) *Attorney, Agent, or Firm* — The Eclipse Group, LLP

(57) ABSTRACT

In general, a mobile unit for communicating with other mobile units assigned to a group within a Multipoint Voice Network ("MVN") having a plurality of groups is shown. The mobile unit may include a time division multiple access ("TDMA") transmitter, a TDMA receiver, and a controller. The TDMA transmitter is enabled to transmit a set of multiple carrier frequencies, where the TDMA transmitter is configured to transmit on one frequency chosen from a sub-set of multiple carrier frequencies from the set of multiple carrier frequencies. The sub-set of multiple carrier frequencies corresponds to the group to which the mobile unit is assigned. The TDMA receiver is configured to receive and demodulate the sub-set of multiple carrier frequencies and the controller configures the TDMA receiver to receive and demodulate the sub-set of multiple carrier frequencies that is assigned to the group. A switch may be utilized to set time slots for the TDMA transmitter and the TDMA receiver.

13 Claims, 15 Drawing Sheets

(56) References Cited

U.S. PATENT DOCUMENTS

| | | |
|---|---|---|
| 6,894,988 B1 | 5/2005 | Zehavi |
| 7,013,158 B1 * | 3/2006 | Cook ............................ 455/519 |
| 7,103,392 B2 | 9/2006 | Fletcher et al. |
| 2001/0008384 A1 | 7/2001 | Ku |
| 2003/0054846 A1 | 3/2003 | Parry |
| 2003/0186666 A1 * | 10/2003 | Sindhushayana ............. 455/260 |
| 2007/0105559 A1 * | 5/2007 | Dillon et al. .................. 455/443 |
| 2008/0009308 A1 | 1/2008 | Bar et al. |

* cited by examiner

WIRELESS MULTIPOINT VOICE NETWORK

CROSS-RELATED APPLICATIONS

This application is a continuation-in-part of U.S. patent application Ser. No. 11/066,798 titled "A Multi-channel Communication Device," to S. Pasternak, filed on Feb. 25, 2005. This application is also a continuation-in-part of U.S. patent application Ser. No. 11/759,173 titled "Wireless Multipoint Voice Network," to T. Gentille et al., filed on Jun. 6, 2007. Both of these applications are herein incorporated by reference in their entirety.

BACKGROUND OF THE INVENTION

1. Field of Invention

The invention relates to wireless communication networks, and in particular to wireless communication networks utilizing multipoint techniques.

2. Related Art

Simple wireless communication systems utilizing a communication network are well known in the art for allowing multiple users to communicate with each other via a simple communication network. In FIG. 1, an example of an implementation of a known wireless communication system 100 utilizing a point-to-multipoint link is shown. The communication system may include a basestation 102 in signal communication with a plurality of mobile stations 104, 106, and 108. In this example, three mobile stations 104, 106, and 108 are shown in signal communication with the basestation 102; however, it is appreciated by those skilled in the art that there may be from one to any plurality of mobile stations in signal communication with the basestation 102. Generally, the number of mobile stations within known systems is limited by the number of frequencies that the basestation is built to demodulate. As an example, the number is typically 4. The wireless communication system 100 utilizes a point-to-multipoint link that enables multiple users possessing individual mobile stations to communicate with each other through the basestation 102. In general, the mobile stations 104, 106, and 108 are capable of transmitting signals on separate frequencies to the basestation 102 and receiving a common broadcast from the basestation 102. As an example of operation, if a user at the first mobile station 104 desires to communicate with another user, or users, at the second mobile station 106 and/or the third mobile station 108, the first mobile station 104 may transmit a first communication signal 110, at a frequency $F_1$, to the basestation 102. The basestation 102 receives the first communication signal 110 and, in response, transmits a broadcast communication signal 112, at a basestation frequency $F_0$, that is broadcast to all the mobile stations 104, 106, and 108. Similarly, if a user at the second mobile station 106 desires to communicate with another user, or users, at the first mobile station 104 and/or third mobile station 108, the second mobile station 106 may transmit a second communication signal 114, at a frequency $F_2$, to the basestation 102. The basestation 102 receives the second communication signal 114 and, in response, transmits the broadcast communication signal 112, which is broadcast to all the mobile stations 104, 106, and 108. Moreover, if a user at the third mobile station 108 desires to communicate with another user, or users, at the first mobile station 104 and/or second mobile station 106, the third mobile station 108 may transmit a third communication signal 116, at a frequency $F_3$, to the basestation 102. The basestation 102 receives the third communication signal 116 and, in response, transmits the broadcast communication signal 112, which is again broadcast to all the mobile stations 104, 106, and 108.

Unfortunately in this example, none of the mobile stations are capable of communicating directly with each other without first being routed through the basestation 102 and the communication is not private because once being routed through the basestation 102, the desired communication is broadcast to all mobile stations. Therefore, there is a need for a new communication system that allows mobile stations to directly communicate with each other in a network without being routed through a basestation.

SUMMARY

In general, a mobile unit for communicating with other mobile units assigned to a group within a Multipoint Voice Network ("MVN") having a plurality of groups is shown. The mobile unit may include a transmitter enabled to transmit a set of multiple carrier frequencies, where the transmitter is configured to transmit on one frequency chosen from a sub-set of multiple carrier frequencies from the set of multiple carrier frequencies. The sub-set of multiple carrier frequencies corresponds to the group. The mobile unit may also include a receiver configured to receive and demodulate the sub-set of multiple carrier frequencies and a controller in signal communication with the receiver, wherein the controller configures the receiver to receive and demodulate the sub-set of multiple carrier frequencies that is assigned to the group.

In an example of operation, the mobile unit may perform a process that includes numerous steps. The mobile unit may receive a Radio Frequency ("RF") signal that corresponds to a transmitted signal from a second mobile unit corresponding to the plurality of other mobile units in the MVN and mix it down to an Intermediate Frequency ("IF") signal in an RF Stage of the receiver of the mobile unit. The controller may then select an FM receiver module, in an IF Stage of the receiver, from a plurality of FM receiver modules and then the receiver may demodulate the IF signal with the selected FM receiver module.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of examples of implementations, reference is made to the accompanying drawings that form a part hereof, and which show, by way of illustration, specific implementations of the invention that may be utilized. Other implementations may be utilized and structural changes may be made without departing from the scope of the present invention.

Figure 2:
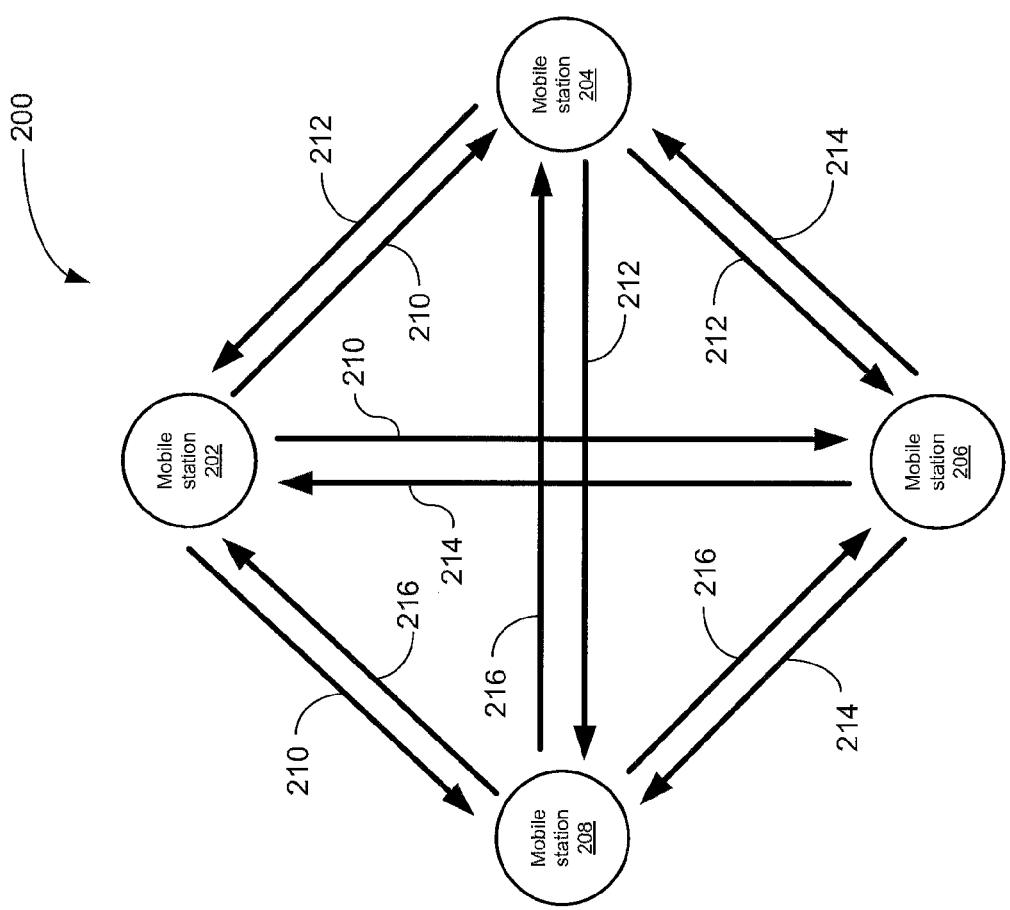
FIG. 2 shows a block diagram of an example of an implementation of a group of mobile stations within a Multipoint Voice Network ("MVN") in accordance with the invention.

In FIG. 2, an example of an implementation of a group of mobile stations (referred to generally as a "Group") 200 within a Multipoint Voice Network ("MVN") is shown. The MVN is a wireless network utilized for voice communication. However, the MVN may be utilized for general audio content including music and signal alerts (such as sirens, warnings, etc.) Group 200 of the MVN may include a plurality of mobile stations, which for this example will include four mobile stations 202, 204, 206, and 208; however, it is appreciated by those skilled in the art that there may be from one to numerous (i.e., more than four) mobile stations without departing from the scope of this invention. The individual mobile stations are in signal communication with each other, where signal communication refers to any type of communication and/or connection between the mobile stations that allows a given mobile station to pass and/or receive signals and/or information from another mobile station. The communication and/or connection may be along any signal path between the mobile stations that allows signals and/or information to pass from one mobile station to another and includes wireless or wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one device to another in varying digital formats without passing through a direct electromagnetic connection.

Figure 1:
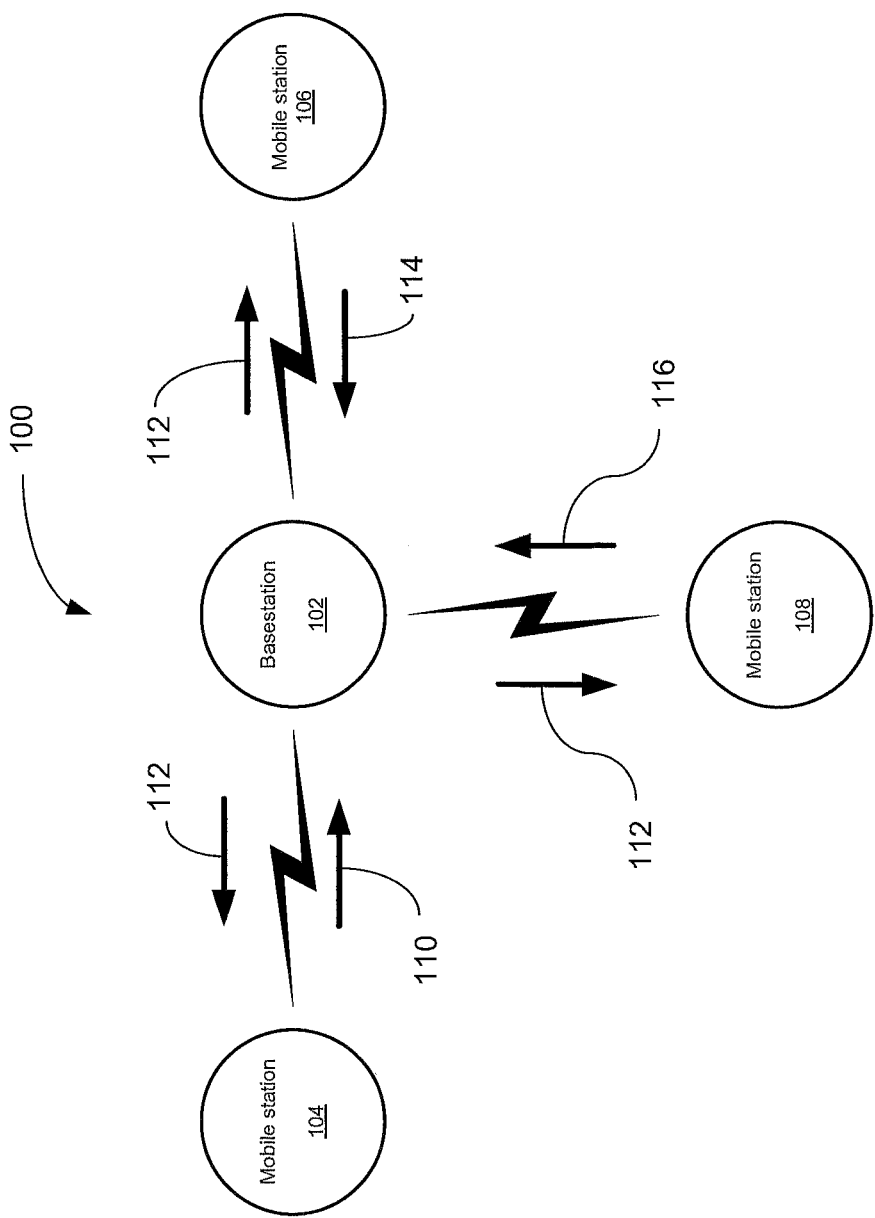
FIG. 1 shows a block diagram of an example of an implementation of a known wireless communication system utilizing a point-to-multipoint link.

Both the MVN and Group 200 utilize multipoint links that enable multiple users possessing individual mobile stations to communicate with each other without the need to pass through a basestation as shown in FIG. 1. Multipoint links are communication links within a multipoint network, which is a communication network having multiple "points" (such as mobile stations) in the network that are capable of receiving transmissions from all other points in the network without requiring a "central point" (such as a basestation).

In general, the mobile stations 202, 204, 206, and 208, in FIG. 2, are configured to transmit on a plurality of separate frequencies corresponding to a set of frequencies designated to the MVN. However, each mobile station 202, 204, 206, and 208 is capable of transmitting on only one carrier frequency for a given transmission. The transmitter of each mobile station is tunable so that this frequency may be selected from a predetermined group of frequencies which correspond to the assigned group of the mobile station.

Additionally, the mobile stations 202, 204, 206, and 208, in FIG. 2, are configured to receive signals on a plurality of separate frequencies that are a sub-set of frequencies corresponding to frequencies designated to Group 200, which are within the set of frequencies designated to the MVN. In general, the receiver of each mobile station is configured to demodulate multiple frequencies (all of the frequencies which correspond to the frequencies within its assigned group) which correspond to multiple transmitters of the mobile stations 202, 204, 206, and 208 with each transmitter within each mobile station transmitting on only one frequency.

The mobile stations 202, 204, 206, and 208 may each include a controller (not shown) that configures an individual mobile station to receive a specific sub-set of frequencies corresponding to frequencies designated to Group 200.

As an example of operation, if a user at the first mobile station 202 desires to communicate with another user, or users, at the second mobile station 204, third mobile station 206, and/or fourth mobile station 208, the first mobile station 202 may transmit a first communication signal 210, at a first frequency $F_1$, to the second mobile station 204, third mobile station 206, and/or fourth mobile station 208. Similarly, if a user at the second mobile station 204 desires to communicate with another user, or users, at the first mobile station 202, third mobile station 206, and/or fourth mobile station 208, the second mobile station 204 may transmit a second communication signal 212, at a second frequency $F_2$, to the first mobile station 202, third mobile station 206, and/or fourth mobile station 208. Additionally, if a user at the third mobile station 206 desires to communicate with another user, or users, at the first mobile station 202, second mobile station 204, and/or fourth mobile station 208, the third mobile station 206 may transmit a third communication signal 214, at a third frequency $F_3$, to the first mobile station 202, second mobile station 204, and/or fourth mobile station 208. Moreover, if a user at the fourth mobile station 208 desires to communicate with another user, or users, at the first mobile station 202, second mobile station 204, and/or third mobile station 206, the fourth mobile station 208 may transmit a fourth communication signal 216, at a fourth frequency $F_4$, to the first mobile station 202, second mobile station 204, and/or third mobile station 206.

Figure 3:
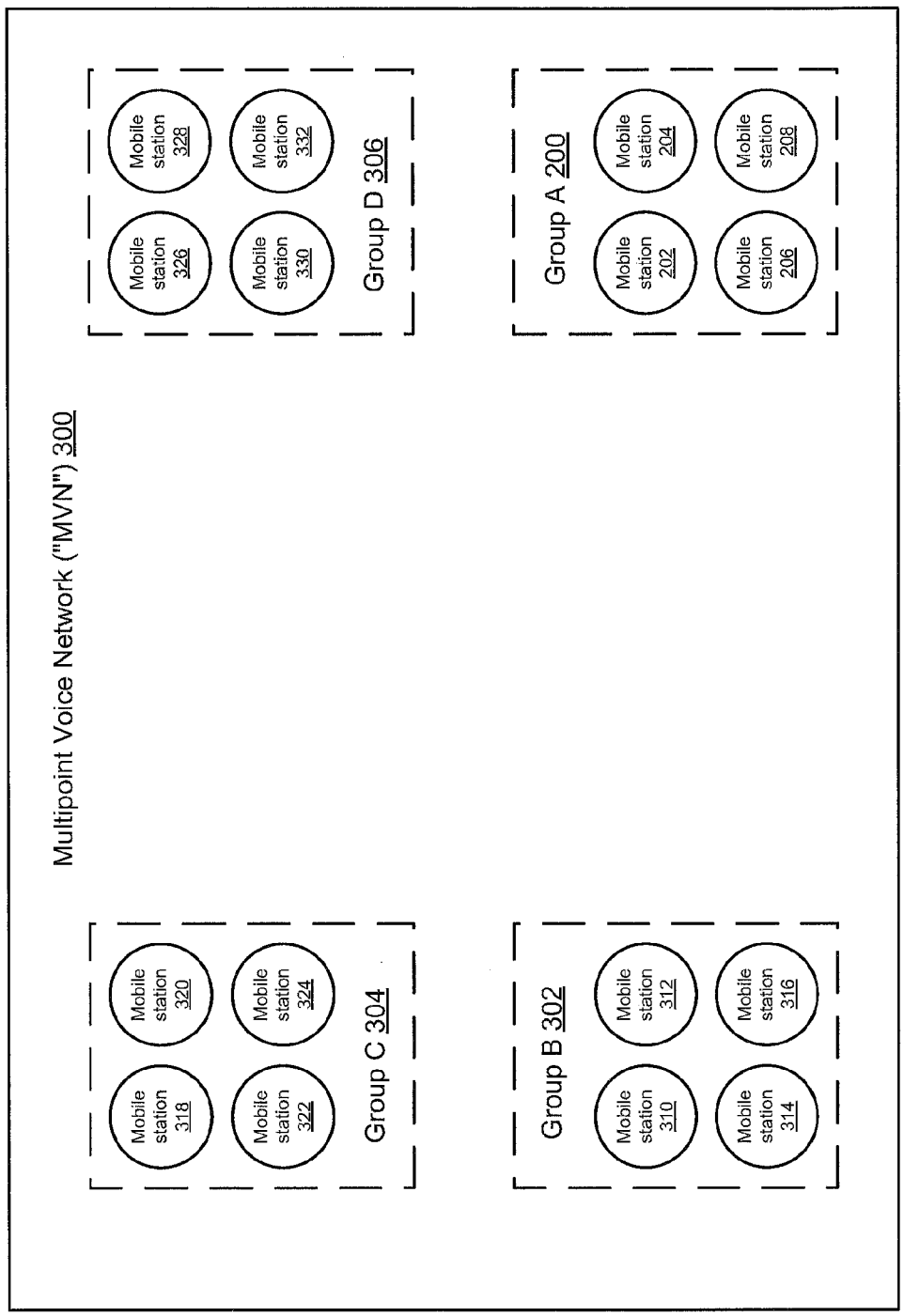
FIG. 3 shows a block diagram of an implementation of a MVN having a plurality of groups including Group A described in FIG. 2 in accordance with the invention.

The MVN may include numerous groups. As an example, FIG. 3 shows an implementation of a MVN 300 having a plurality of groups including Group A 200 described in FIG. 2. In this example, the MVN 300 may also include three additional groups (for example Group B 302, Group C 304, and Group D 306). In this example, each group is shown to include four mobile stations such as mobile stations 310, 312, 314, and 316 for Group B 302, mobile stations 318, 320, 322, and 324 for Group C 304, and mobile stations 326, 328, 330, and 332 for Group D 304; however, it is appreciated that there may be from one to numerous mobile stations and/or groups without departing from the scope of this invention.

Figure 4:
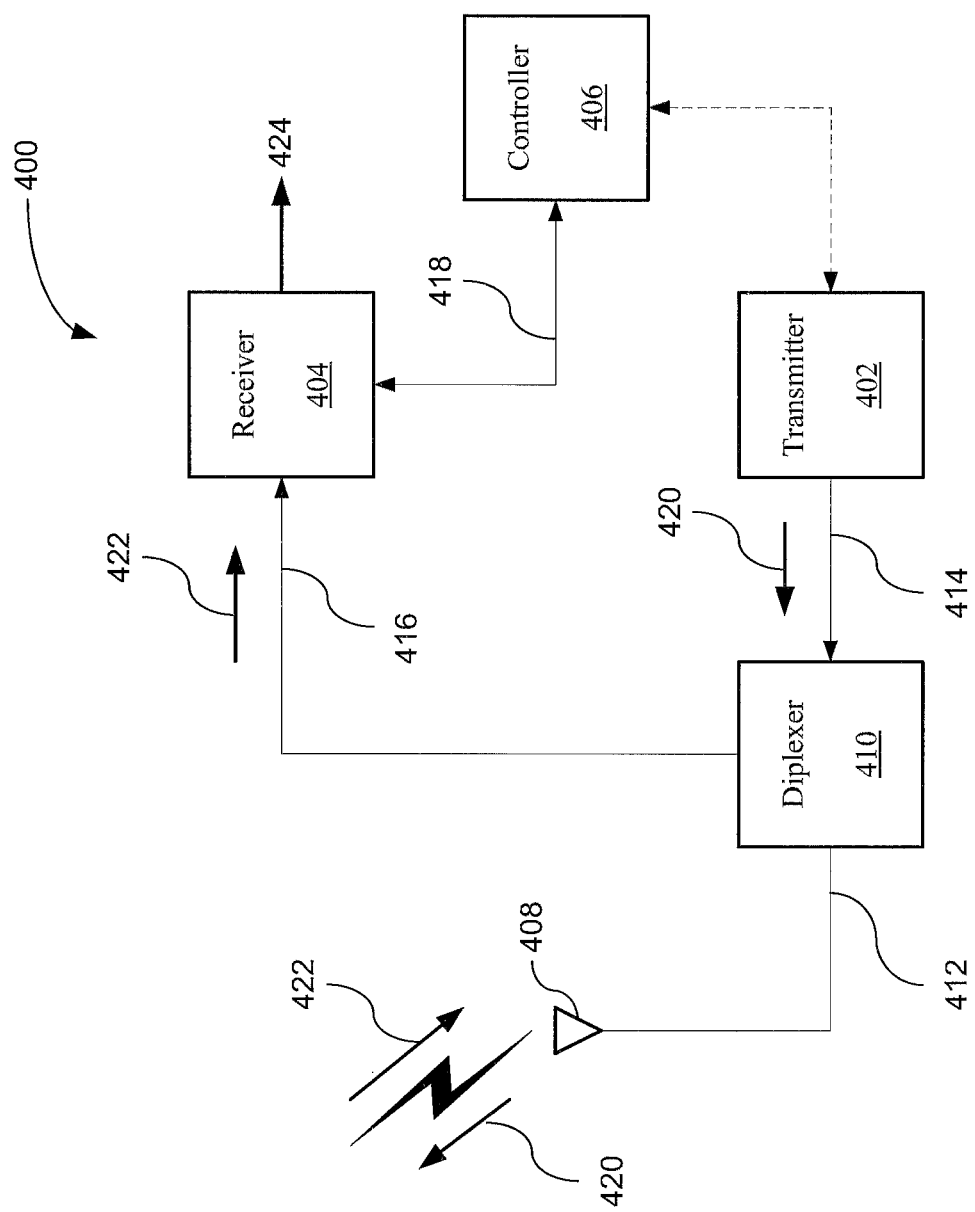
FIG. 4 shows a block diagram of an example of an implementation of a mobile station in accordance with the invention.

In FIG. 4, an example of an implementation of mobile station 400 is shown. The mobile station 400 may include a transmitter 402, receiver 404, controller 406, antenna 408, and diplexer 410. In this example, the diplexer 410 may be in signal communication with the antenna 408, transmitter 402, and receiver 404 via signal paths 412, 414, and 416, respectively. The controller 406 may be in signal communication with the receiver 404 via signal path 418. Additionally, the controller 406 optionally may also be in signal communication with the transmitter 402.

In an example of operation in a transmission mode, the transmitter 402 is capable of transmitting on a plurality of separate carrier frequencies (as described in FIG. 2 above) corresponding to a set of frequencies designated to the MVN. As such in transmission mode, the transmitter 402 transmits an output signal 420 that is passed through the diplexer 410, antenna 408, and signal paths 414 and 412.

In an example of operation in a reception mode, the mobile station 400 receives an input signal 422 that is passed through the antenna 408, diplexer 410, and signal paths 412 and 416 to the receiver 404. If the input signal 422 includes a carrier frequency that is within the sub-set of frequencies corresponding to frequencies designated for the group for which the mobile station 400 is a member, the receiver 404 receives and demodulates the input signal to produce a received signal 424.

The controller 406 may be utilized to configure the receiver 404 by selecting which sub-set of frequencies, corresponding to the different groups, will be received by the receiver 404. The controller 406 may be part of the receiver 404 or a separate component. The controller 406 may be a programmable electronic device such as, for example, a microprocessor, microcontroller, or similar device, or a mechanical and/or electrical switch.

In this example, the diplexer 410 may be a standard diplexer circuit, hybrid coupler used to diplex the input signal 422 and output signal 420, or similar component. The diplexer 410 may include an attenuator (not shown) that is programmable and is enabled when the transmitter 402 is turned on. The attenuator may be utilized to prevent the transmitter 402 from saturating the front-end (not shown) of the receiver 404. Alternatively, the attenuator may be external to the diplexer 410 and part of the front-end of the receiver 404.

The set of frequencies may be chosen dependent on the design of the MVN. As an example, the MVN may be designed to be a wireless multipoint voice network that utilizes frequency division multiple access ("FDMA") techniques where the set of frequencies are chosen such that the MVN allows a predetermined number of mobile stations to divide the frequency spectrum of the set of frequencies of MVN among the predetermined number of mobile stations so that the mobile stations are able to transmit and receive information on the MVN in a multiplexed fashion. As such, each mobile station is assigned a specific and discrete carrier frequency for communication in the MVN.

As an example, turning back to FIG. 3, the MVN 300 is shown having 16 mobile stations 202, 204, 206, 208, 310, 312, 314, 316, 318, 320, 322, 324, 326, 328, 330, and 332 divided into four groups: Group A 200, Group B 302, Group C 304, and Group D 306. In this example, the MVN 300 may be designed to operate using a total set of 16 individual carrier frequencies (also known as "channels" or "channel frequencies") divided into four (4) sub-sets of frequencies where each sub-set is assigned to a specific group. As a result, mobile stations in Group A 200 are configured to only receive carrier frequencies that correspond to the sub-set of frequencies assigned to Group A 200. Similarly, Group B 302, C 304 and D 306 may only receive carrier frequencies that correspond to the sub-set of frequencies assigned to the corresponding group. However, while the mobile stations are limited to only receiving frequencies corresponding to their assigned group, the mobile stations may still transmit optionally on any frequency within the entire set of frequencies of the MVN.

Using FDMA techniques in this example, each individual mobile station 202, 204, 206, 208, 310, 312, 314, 316, 318, 320, 322, 324, 326, 328, 330, and 332 may transmit on one of the frequencies of the set of 16 channel frequencies. The set of 16 channels may be divided into four sub-sets of channel frequencies corresponding to the four groups: Group A 200, Group B 302, C 304 and D 306. As a result, each group may be assigned a specific sub-set of four channel frequencies denoted as $F_{group,1}$, $F_{group,2}$, $F_{group,3}$, and $F_{group,4}$. Therefore, each mobile station may have a specific assigned frequency channel for transmitting such as, for example: $F_{A,1}$ for mobile station 202 in Group A 200; $F_{A,2}$ for mobile station 204 in Group A 200; $F_{A,3}$ for mobile station 206 in Group A 200; $F_{A,4}$ for mobile station 208 in Group A 200; $F_{B,1}$ for mobile station 310 in Group B 302; $F_{B,2}$ for mobile station 312 in Group B 302; $F_{B,3}$ for mobile station 314 in Group B 302; $F_{B,4}$ for mobile station 316 in Group B 302; $F_{C,1}$ for mobile station 318 in Group C 304; $F_{C,2}$ for mobile station 320 in Group C 320; $F_{C,3}$ for mobile station 322 in Group C 304; $F_{C,4}$ for mobile station 324 in Group C 304; $F_{D,1}$ for mobile station 326 in Group D 306; $F_{D,2}$ for mobile station 328 in Group D 306; $F_{D,3}$ for mobile station 330 in Group D 306; and $F_{D,4}$ for mobile station 332 in Group D 306.

The receivers in the individual mobile stations may then be configured to demodulate only all four channel frequencies that correspond to the group that the mobile station is assigned. As an example, mobile stations 202, 204, 206, and 208 are configured to only demodulate signals having a carrier frequency corresponding to the sub-set of channel frequencies $F_{A,1}$, $F_{A,2}$, $F_{A,3}$, and $F_{A,4}$ assigned to Group A 200. Similarly, mobile stations 310, 312, 314, and 316 are configured to only demodulate signals having a carrier frequency corresponding to the sub-set of channel frequencies $F_{B,1}$, $F_{B,2}$, $F_{B,3}$, and $F_{B,4}$ assigned to Group B 302, mobile stations 318, 320, 322, and 324 are configured to only demodulate signals having a carrier frequency corresponding to the sub-set of channel frequencies $F_{C,1}$, $F_{C,2}$, $F_{C,3}$, and $F_{C,4}$ assigned to Group C 304, and mobile stations 326, 328, 330, and 332 are configured to only demodulate signals having a carrier frequency corresponding to the sub-set of channel frequencies $F_{D,1}$, $F_{D,2}$, $F_{D,3}$, and $F_{D,4}$ assigned to Group D 306.

Figure 5:
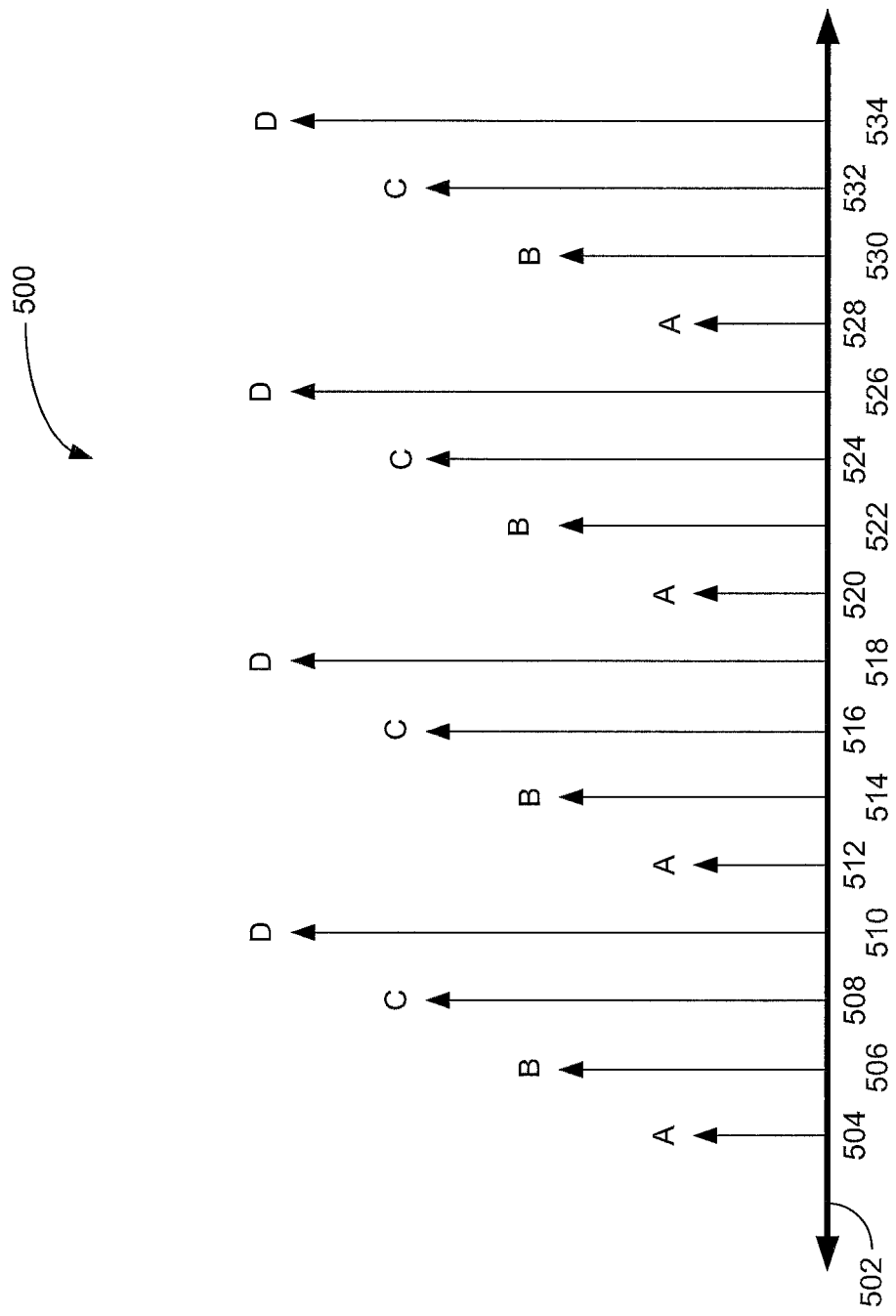
FIG. 5 shows a graphical representation of an example of a plot of interleaved groupings of channel frequencies along a frequency axis.

The sub-set of group frequencies may be organized into a frequency plan that is interleaved as shown in FIG. 5. In FIG.

5, an example of a plot 500 of interleaved groupings of channel frequencies along a frequency axis 502 is shown. In this example, the frequency channels, in order of lowest frequency to highest frequency, may be organized as follows: $F_{A,1}$ 504, $F_{B,1}$ 506, $F_{C,1}$ 508, $F_{D,1}$ 510, $F_{A,2}$ 512, $F_{B,2}$ 514, $F_{C,2}$ 516, $F_{D,2}$ 518, $F_{A,3}$ 520, $F_{B,3}$ 522, $F_{C,3}$ 524, $F_{D,3}$ 526, $F_{A,4}$ 528, $F_{B,4}$ 530, $F_{C,4}$ 532, and $F_{D,4}$ 534.

As an example of an implementation, the channel frequencies may be chosen from the Ultra-high frequency ("UHF") band with corresponding local oscillator ("LO") frequency $F_{LO}$ as shown below in table 1.

TABLE 1

| Group | $F_{group,1}$ | $F_{group,2}$ | $F_{group,3}$ | $F_{group,4}$ | $F_{LO}$ |
|---|---|---|---|---|---|
| A | 945 Mhz | 946.6 Mhz | 948.2 Mhz | 949.8 Mhz | 865 Mhz |
| B | 945.4 Mhz | 947 Mhz | 948.6 Mhz | 950.2 Mhz | 865.4 Mhz |
| C | 945.8 Mhz | 947.4 Mhz | 949 Mhz | 950.6 Mhz | 865.8 Mhz |
| D | 946.2 Mhz | 947.8 Mhz | 949.4 Mhz | 951 Mhz | 866.2 Mhz |

Figure 6:
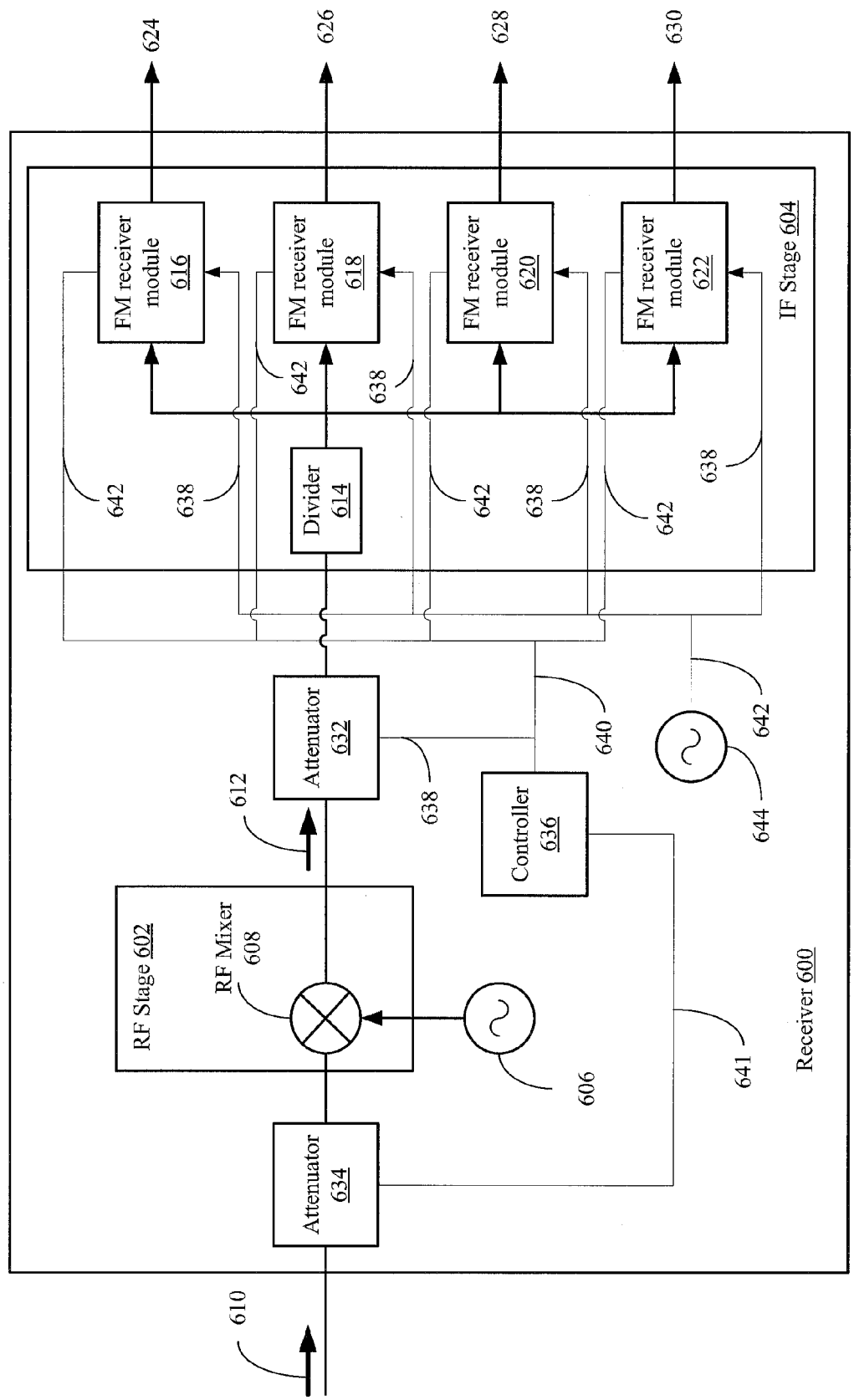
FIG. 6 shows a block diagram of an example of an implementation of a receiver shown in FIG. 4 in accordance with the invention.

Turning back to FIG. 4, the receiver 404 may be implemented as a two-stage receiver having a radio frequency ("RF") stage and an intermediate-frequency ("IF") stage as shown in FIG. 6. In FIG. 6, a receiver 600 includes a RF stage 602, IF stage 604, and RF LO 606. The RF stage 602 may include a mixer 608, in signal communication with the RF LO 606 capable of demodulating RF input signals 610 at an RF frequency band (such as the channel frequencies listed in table 1) to IF signals 612 at an IF frequency band such as, for example, 76 to 87 Mhz.

The IF stage 604 may include a divider circuit 614 and multiple frequency modulation ("FM") receivers 616, 618, 620, and 622 for demodulating the IF signals 612 into corresponding baseband output signals 624, 626, 628, and 630. The RF stage 602 and IF stage 604 may be in signal communication via an optional variable attenuator 632. There may also be a second optional variable attenuator 634 in signal communication with both the RF stage 602 and diplexer 410, FIG. 4. A controller 636 may also be in signal communication with the first attenuator 632 and the plurality of FM receivers 616, 618, 620, and 622, and the second attenuator 634 via signal paths 638, 640, and 641, respectively. Additionally, a second RF LO 644 may be in signal communication with the FM receivers 616, 618, 620, and 622, via signal path 642.

The controller 636 may be a microcontroller, processor, microprocessor, digital signal processor ("DSP"), application specific integrated circuit ("ASIC"), or other similar device. The controller 636 may control the FM receivers 616, 618, 620, and 622 and attenuators 632 and 634 via a serial peripheral interface ("SPI"). It is appreciated by those skilled in the art that that SPI is only an example and other interfaces or protocols may also be used.

In this example, the attenuators 632 and 634 are programmable variable attenuators. The attenuators 634 and 632 may be switchable attenuators that prevent the receiver low noise amplifiers ("LNAs") (not shown) from being saturated both in the RF front stage 602 and/or the individual FM receiver module front ends (not shown), respectively. In the example of the RF front stage 602, attenuator 634 may be in signal communication with an LNA (not shown) either connected in front of, or as part of, the RF front stage 602.

In an example of operation, the receiver 600 receives RF input signals 610 at an RF frequency band (such as the channel frequencies listed in table 1) at the optional variable attenuator 634. If present, the variable attenuator 634 prevents saturation of the RF Mixer 608 in the RF Stage 602 by attenuating the RF input signals 610 if their power amplitude is too high for the RF Mixer 608. The resulting attenuated RF signals are then passed to the RF Mixer 608. The RF Mixer 608 mixes the attenuated RF signals with a frequency reference signal from the RF LO 606 to produce the IF signals 612 which have been mixed down to an IF frequency band such as, for example, 76 to 87 Mhz. The IF signals 612 are then passed through the other optional variable attenuator 632 to the divider 614 of the IF Stage 604. If present, the variable attenuator 632 prevents saturation of the front ends of the respective FM receiver modules 616, 618, 620, and 622 by attenuating the IF input signals 612 if their power amplitude is too high for the FM receiver modules 616, 618, 620, and 622. The resulting attenuated IF signals are then passed to the divider 614 and to the FM receiver modules 616, 618, 620, and 622. The FM receiver modules 616, 618, 620, and 622 receive the IF signals and demodulate them to produce the output baseband signals 624, 626, 628, and 630, respectively.

Figure 7:
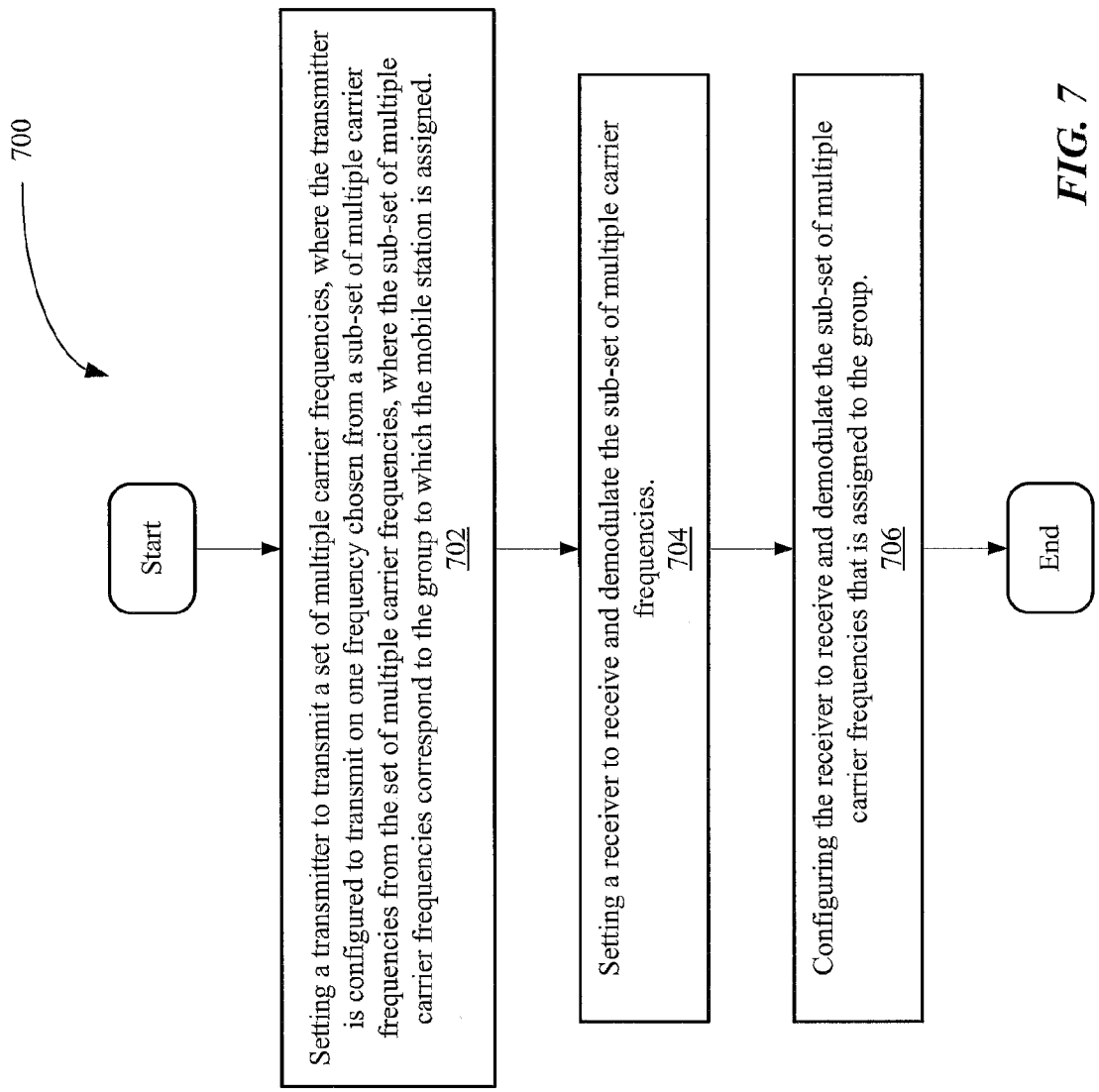
FIG. 7 shows a flowchart that illustrates an example process for configuring the mobile station shown in FIG. 4 in accordance with the invention.

In FIG. 7, a flowchart 700 is shown that illustrates an example process for configuring the mobile station 400, FIG. 4, for operation. The process begins in step 702, the transmitter is set to transmit a set of multiple carrier frequencies, wherein the transmitter is configured to transmit on one frequency chosen from a sub-set of multiple carrier frequencies from the set of multiple carrier frequencies. In this example, the sub-set of multiple carrier frequencies corresponds to the group.

In step 704, the receiver is set to receive and demodulate the sub-set of multiple carrier frequencies and, in step 706, the receiver is configured to receive and demodulate the sub-set of multiple carrier frequencies that is assigned to the group.

In general, the receiver is set to receive and demodulate the sub-set of multiple carrier frequencies that have been predetermined to correspond to the group. Similarly, the transmitter is set to utilize a predetermined frequency chosen from the sub-set of multiple carrier frequencies as described in FIG. 5.

Configuring the receiver to receive and demodulate the sub-set of multiple carrier frequencies that is assigned to the group includes selecting an FM receiver module to utilize from a plurality of FM receiver modules.

Figure 8:
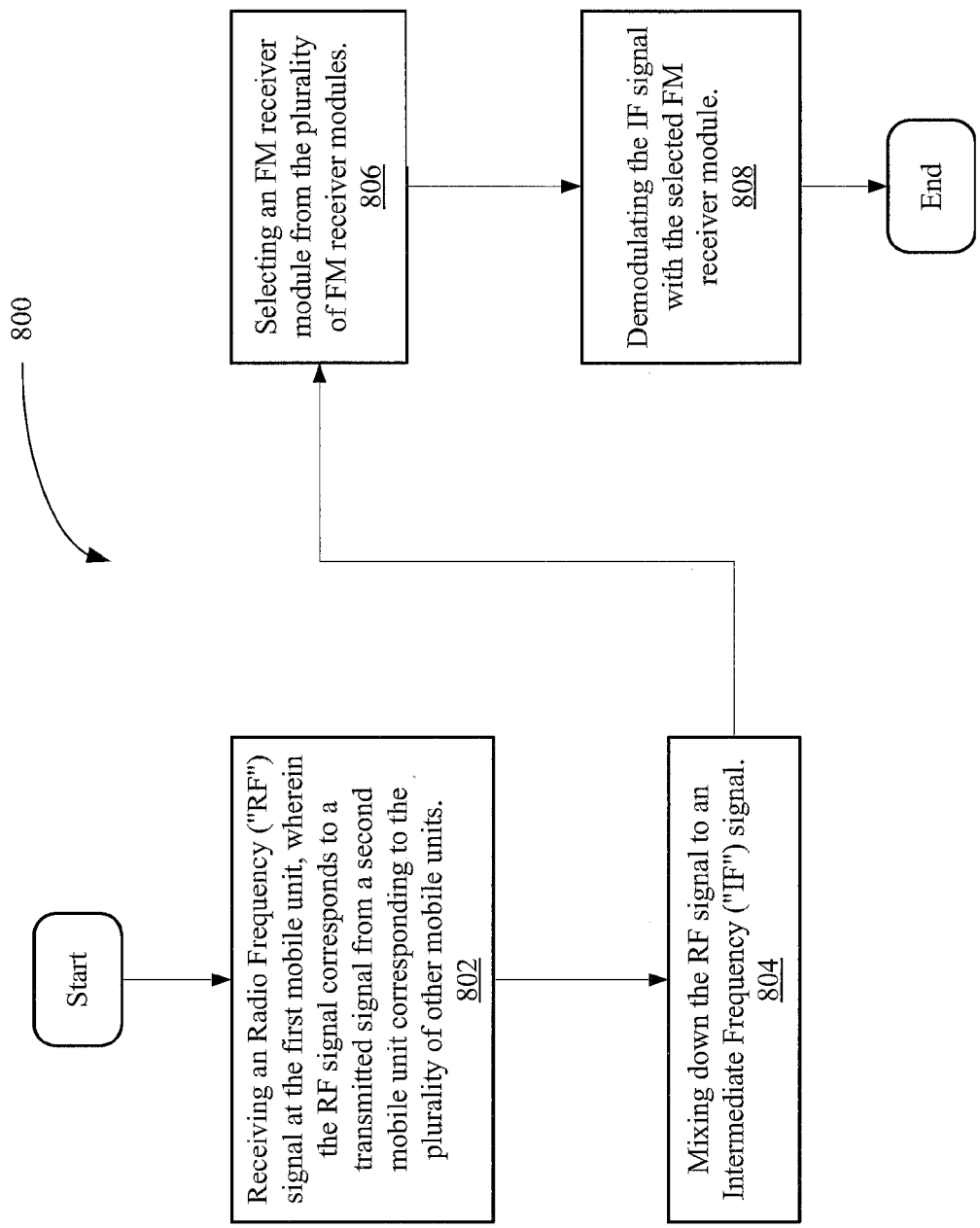
FIG. 8 shows a flowchart that illustrates an example process performed by the mobile station shown in FIG. 4 in accordance with the invention.

As an example of operation, in FIG. 8 a flowchart 800 is shown that illustrates an example process performed by mobile station 400, FIG. 4, in operation. The process begins in step 802, the mobile station 400 receives an RF signal. The RF signal corresponds to a transmitted signal from a second mobile station corresponding to the plurality of other mobile units in the MVN. In step 804, the RF Stage 602, FIG. 2, of the receiver 600 in the mobile station 400 mixes down the RF signal to an IF signal. In step 806, the controller selects an FM receiver module in the IF Stage 604 from the plurality of FM receiver modules and, in step 808, the IF Stage 604 demodulates the IF signal with the selected FM receiver module. The process then ends.

Figure 9:
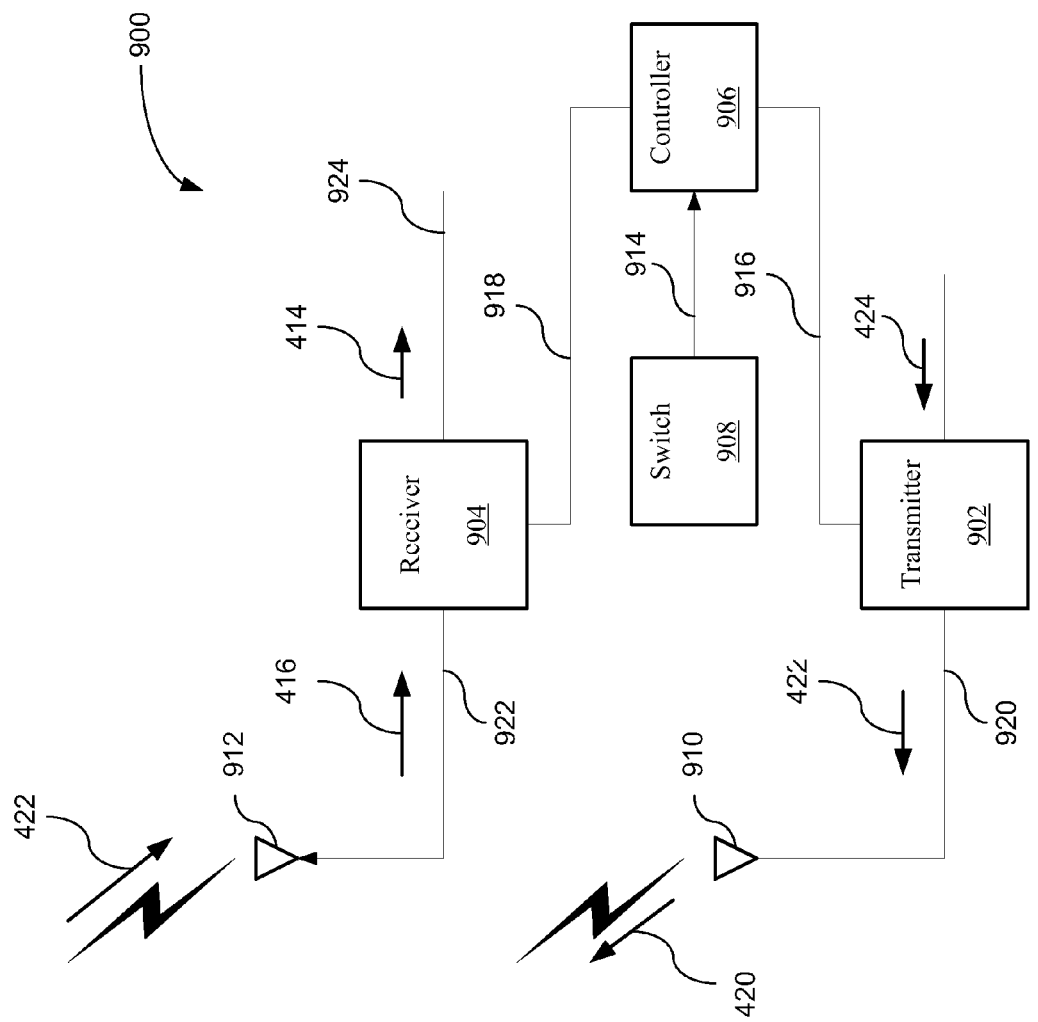
FIG. 9 shows a block diagram of another example of an implementation of a mobile station in accordance with the invention that utilizes time division multiple access ("TDMA") principles.

In FIG. 4 through FIG. 8, an example of an implementation of the mobile station 400 within the MVN was described utilizing FDMA principles. In FIG. 9, a block diagram of an example of another implementation of a mobile station 900 utilizing TDMA principles is shown. The mobile station 900 may include a transmitter 902, receiver 904, controller 906, switch 908, first antenna 910, and second antenna 912. In this example, controller 906 may be in signal communication with the switch 908, transmitter 902, and receiver 904 via signal paths 914, 916, and 918, respectively. The first antenna 910 may be in signal communication with the transmitter 902 via signal path 920 and the second antenna 912 may be in signal communication with the receiver 904 via signal path 922. Additionally, the receiver 904 optionally may also be in signal communication with mixers (not shown), processors (not shown), or other baseband processing circuitry, components, and/or devices (not shown) via signal path 924. The signal path 920 may include an optional balun (not shown) between the transmitter 902 and first antenna 910. Similarly, the signal path 922 may include an optional balun (not shown) between the receiver 904 and second antenna 912. It is appreciated by those skilled in the art that both the transmitter 902 and receiver 904 may both be individual transceivers where the transmitter 902 is a transceiver that is configured to operate as a transmitter and where the receiver 904 is a transceiver that is configured to operate as a receiver.

It is appreciated by those skilled in the art that time division multiple access ("TDMA") is a channel access method for shared medium networks. It allows several users to share the same frequency channel by dividing the signal into different time slots. The users transmit in rapid succession, one after the other, each using his/her own time slot. This allows multiple stations to share the same transmission medium (e.g., radio frequency channel) while using only a part of its channel capacity. TDMA is well known in the art and is used, for example, in cellular systems such as Global System for Mobile Communications ("GSM"), IS-136, Personal Digital Cellular ("PDC") and iDEN, in the Digital Enhanced Cordless Telecommunications ("DECT") standard for portable phones, satellite systems, and combat-net radio systems.

Figure 10:
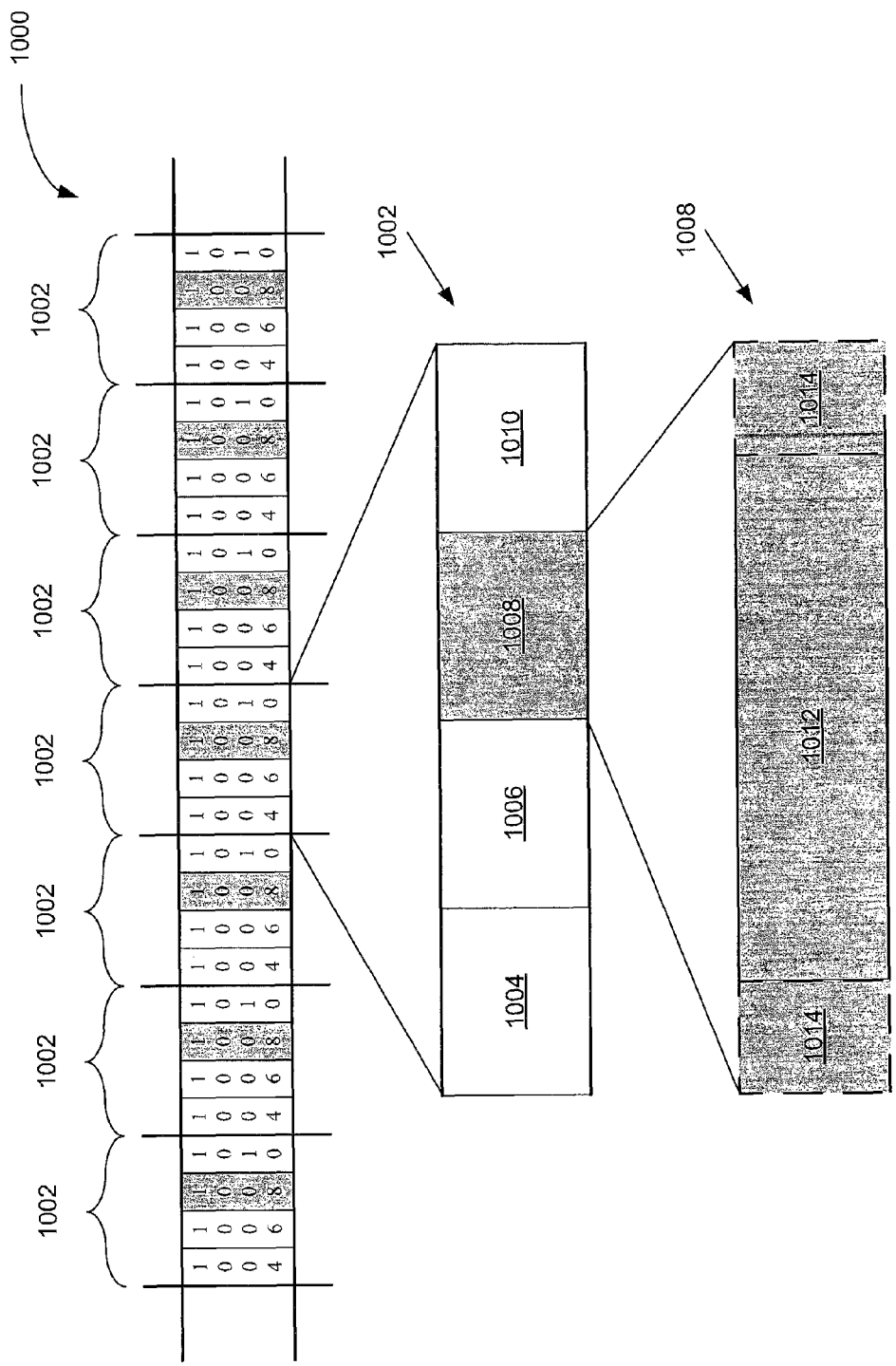
FIG. 10 shows a data stream utilizing TDMA principles that is divided into multiple frames.

As an example, FIG. 10 shows a data stream 1000 utilizing TDMA that is divided into multiple frames 1002. The individual frames 1002 are further divided into time slots 1004, 1006, 1008 and 1010, where each individual time slot is allocated to a mobile station such as, for example, time slot 1008 being allocated to mobile station 900 in FIG. 9. In this example, four time slots 1004, 1006, 1008 and 1010 are shown; however, it is appreciated that the number of time slots could be less than or greater than four without departing from the scope of the invention. Each time slot (such as time slot 1008) may contain data 1012 with an optional guard period 1014 for synchronization. The individual frames 1002 may also optionally include preamble (not shown) and trailing bits (not shown), and the time slots (such as time slot 1008) may also include optional trail bits (not shown), synchronization bits (not shown), etc.

In general, TDMA is a type of time-division multiplexing, with the special point that instead of having one transmitter connected to one receiver, there are multiple transmitters. An advantage of TDMA is that a radio receiver of a mobile station only needs to listen and broadcast for its own time slot. For the rest of the time, the mobile can carry out measurements on the network, detecting surrounding transmitters on different frequencies. If a TDMA/TDD (time division duplexing) scheme is utilized, half the time slots in the individual frames 1002 may be utilized for forward link channels and half may be utilized for reverse link channels. If instead a TDMA/FDD (frequency division duplexing) scheme is utilized, an identical or similar frame structure may be used solely for either forward or reverse transmission, but the carrier frequencies would be different for the forward and reverse links.

Figure 11:
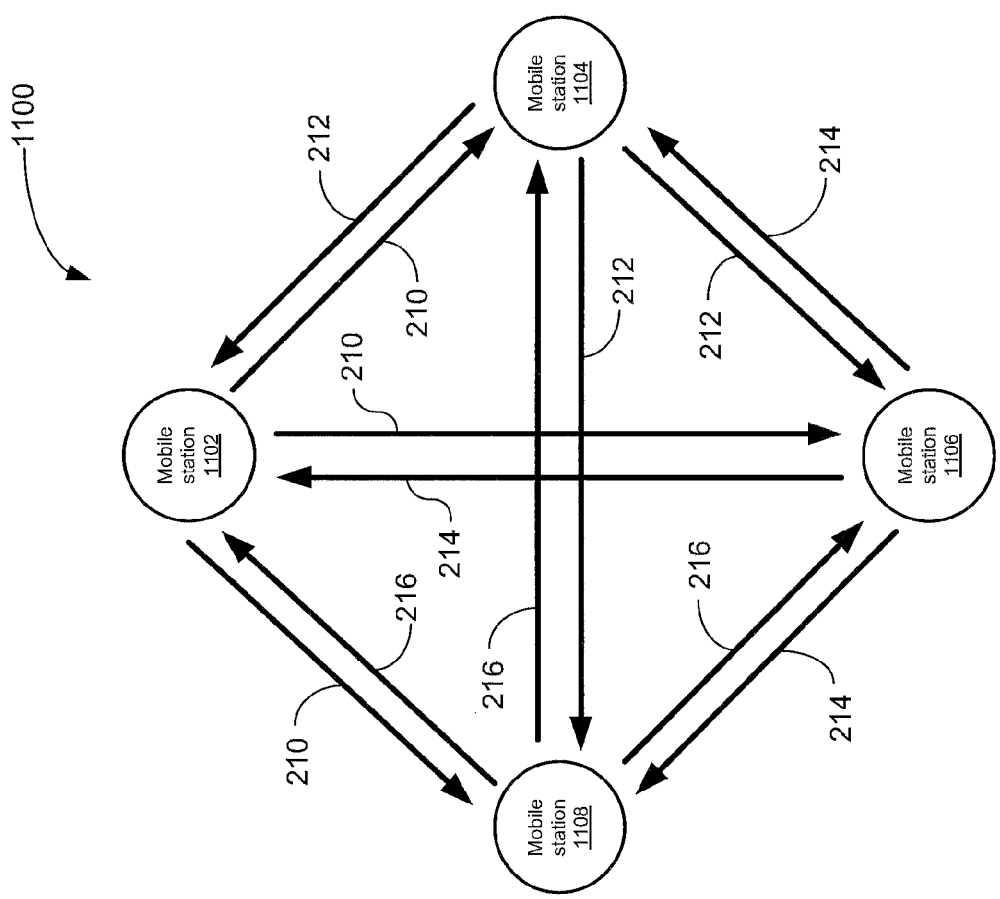
FIG. 11 shows another block diagram of an example of an implementation of a group of mobile stations within a MVN utilizing TDMA principles in accordance with the invention that is similar to the group shown in FIG. 2.

Turning back to FIG. 9, the mobile station 900 may be part of a Group having numerous groups similar to the description in FIG. 2. In FIG. 11, an example of an implementation of a Group 1100 within a MVN is shown. The MVN is a wireless network utilized for voice communication. Similar to FIG. 2, Group 1100 of the MVN may include a plurality of mobile stations, which for this example will include four mobile stations 1102, 1104, 1106, and 1108, however, it is again appreciated by those skilled in the art that there may be from one to numerous (i.e., more than four) mobile stations without departing from the scope of this invention. Again, both the MVN and Group 1100 utilize multipoint links that enable multiple users possessing individual mobile stations to communicate with each other without the need to pass through a basestation as shown in FIG. 1.

As a TDMA/FDD example, in general, the mobile stations 1102, 1104, 1106, and 1108, in FIG. 11, may be configured to transmit and receive on a plurality of separate frequencies corresponding to a set of frequencies designated to the MVN. As an example, the Group 1100 may have four pre-assigned frequencies of operation such as, for example, $F_1$ at 902.5 MHz, $F_2$ at 905 MHz, $F_3$ at 906 MHz, and $F_4$ at 907 MHz. In this example, mobile station 1102 may be set to a master mobile operating at $F_1$, mobile station 1104 may be set to a slave mobile operating at $F_2$, mobile station 1106 may be set to a slave mobile operating at $F_3$, and mobile station 1108 may be set to a slave mobile operating at $F_4$. In this example, there is only one master mobile and the other three mobile stations can only act as slave mobiles once the first mobile station 1102 is set to a master mobile. As an example of an implementation, the mobile stations 1102, 1104, 1106, and 1108 may include a switch (such as switch 908) that sets the operating frequency of the respective mobile station. The switch may be a simple two-bit dip switch with setting 00 for $F_1$, setting 01 for $F_2$, setting 10 for $F_3$, and setting 11 for $F_4$.

In this example, once a mobile station is set to a given frequency, the transmitter is set to transmit on that frequency (such as, for example, $F_1$) while the receiver is set to detect and receive only the other three frequencies ($F_2$, $F_3$, and $F_4$). As such, if mobile station 1102 is set to a master mobile transmitting at $F_1$, it will receive the three frequencies $F_2$, $F_3$, and $F_4$ but not $F_1$. Because mobile station 1102 is a master, mobile stations 1104, 1106, and 1108 will all be slave mobiles. In this example, mobile station 1104 may be set for transmitting at $F_2$, where it will receive the three frequencies $F_1$, $F_3$, and $F_4$ but not $F_2$. Mobile station 1106 may be set for transmitting at $F_3$, where it will receive the three frequencies $F_1$, $F_2$, and $F_4$ but not $F_3$. Mobile station 1108 may be set for transmitting at $F_4$, where it will receive the three frequencies $F_1$, $F_2$, and $F_3$ but not $F_4$.

Alternatively, as an TDMA/TDD example, in general, the mobile stations 1102, 1104, 1106, and 1108, in FIG. 11, may be configured to transmit and receive on only one carrier frequency (such as 916 MHz) corresponding to a frequency designated to the Group 1100 by the MVN. As an example, the Group 1100 may only have one frequency of operation such as, for example, $F_1$ at 916 MHz; however, the transmission scheme for the Group 1100 may include a TDMA scheme utilizing digital frames of data having four time slots per frame (as described in FIG. 10), where each time slot corresponds to a mobile station. As an example, time slots 1004, 1006, 1008 and 1010 may correspond to mobile stations 1102, 1104, 1106, and 1108, respectively. As an example of an implementation, the mobile stations 1102, 1104, 1106, and 1108 may include a switch that sets the time slots of the respective mobile station. The switch may be a simple two-bit dip switch with setting 00 for time slot 1004, setting 01 for time slot 1006, setting 10 for time slot 1008, and setting 11 for time slot 1010.

Similar to the previous example, once a mobile station is set to a given time slot, the transmitter is set to transmit on that time slot (such as, for example, time slot 1004) while the receiver is set to detect and receive only the other three time slots (time slot 1006, time slot 1008, and time slot 1010). As such, if mobile station 1102 is set to a master mobile transmitting on time slot 1004, it will receive signals on the three time slots 1006, 1008, and 1010 but not 1004. Because mobile station 1102 is a master, mobile stations 1104, 1106, and 1108 will all be slave mobiles. In this example, mobile station 1104 may be set for transmitting on time slot 1006, where it will receive signals on the three time slots 1004, 1008, and 1010 but not time slot 1006. Mobile station 1106 may be set for transmitting on time slot 1008, where it will receive signals on the three time slots 1004, 1006, and 1010 but not time slot 1008. Mobile station 1108 may be set for transmitting on time slot 1010, where it will receive signals on the three time slots 1004, 1006, and 1008 but not time slot 1010.

Figure 12:
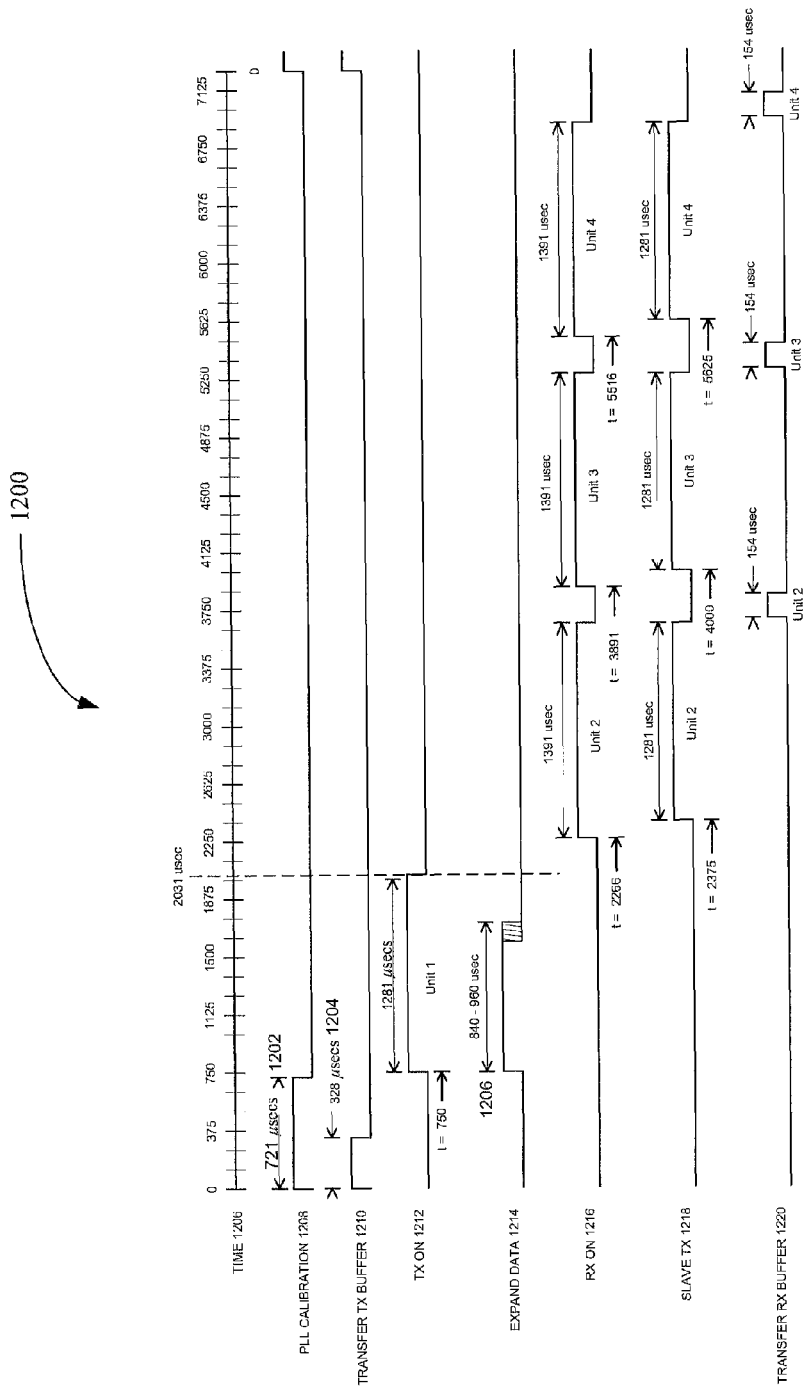
FIG. 12 shows a timing diagram for an example of an implementation of the operation of a mobile station acting as a master mobile at a given frequency.

Turning to FIG. 12, a timing diagram 1200 is shown for an example of an implementation of the operation of the mobile station 1102 acting as a master mobile. In this example, the audio sample rate may be 8 kHz (with a 125 microsecond ("μsec") period) and 16 bit samples are compressed to 8 bits when transmitted, and expanded after reception. The RF data rate is 500 kbps and minimum shift keying ("MSK") modulation is used. There are 58 analog-digital conversion ("ADC") samples per packet such that the packet rate is 58 times 0.125 which equals 7250 μsecs.

The mobile station 1102 may include a phase-locked loop ("PLL") within a transceiver that is calibrated within the 7250 μsec period. The PLL calibration may take about 721 μsecs 1202 but once the calibration is initiated, a processor within the mobile station 1102 may be free to compress the ADC samples received from a CODEC and then transfer them to the transceiver's transmit ("TX") buffer 1204, which may take approximately 328 μsecs. Once the transmit process is initiated, the processor may be utilized to expand the data received from each slave mobile (contained in a receiver ("RX") buffer) and average them. The results may then be transferred to a digital-analog converter ("DAC") of the CODEC over a bus. This process 1206 may takes between 840 and 960 μsecs.

In FIG. 12, the timing diagram 1200 shows the operation of the mobile station 1102 acting as a master mobile at a given frequency (such as, for example 916 MHz) versus time 1206. The mobile station 1102 includes a plot of time for the PLL calibration 1208, transfer to the transmit buffer 1210, transmitter time on 1212, time to expand 1214 received slave data from the other mobile stations 1104, 1106, and 1108, receiver time on 1216, received time 1218 of the data from the other mobile stations 1104, 1106, and 1108 acting like slave mobiles, and time to transfer to the receiver buffer 1220.

From the timing diagram 1200, it is seen that the mobile station 1102 (shown as unit 1) begins transmission at time equals 750 μsecs and ends at time equals 2031 μsecs. At time equals 2266 μsecs, the mobile station 1102 starts listening to the time slots for the slave mobiles. Specifically, the receiver listens for each slave mobile (shown as unit 2 for mobile station 1104, unit 3 for mobile station 1106, and unit 4 for mobile station 1108) in 1391 μsec windows starting at time equals 2266 μsec for unit 2, time equals 3891 μsec for unit 3, and time equals 5516 μsec for unit 4. In this example, the actual times of transmission of the slave mobiles is at time equals 2375 μsec for unit 2, time equals 4000 μsec for unit 3, and time equals 5625 μsec for unit 4 with actual transmission time of 1281 μsec.

Figure 13:
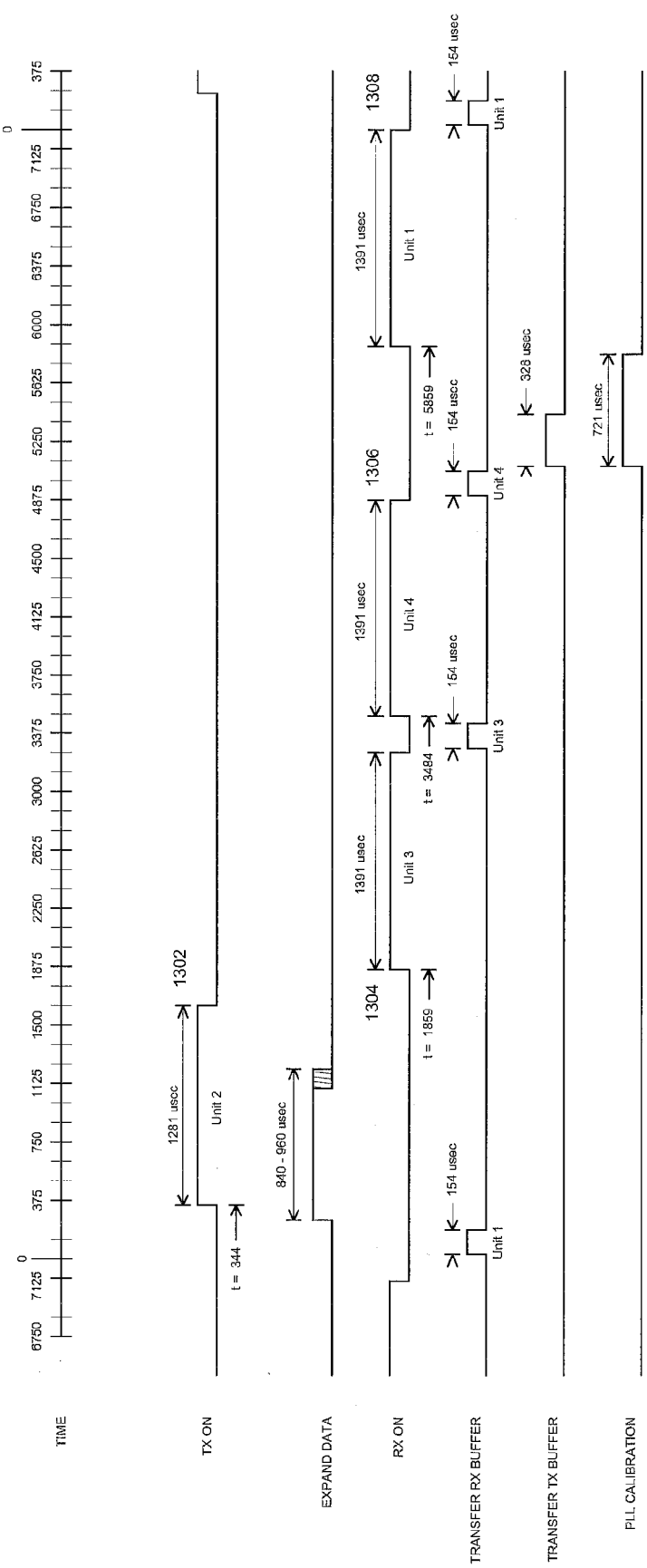
FIG. 13 shows a timing diagram for an example of an implementation of the operation of a mobile station acting as a slave mobile with respect to mobile station shown in FIG. 12.

Similar to FIG. 12, FIGS. 13, 14, and 15 show timing diagrams for the operation of the mobile stations 1104, 1106, and 1108, respectively, acting as slave mobiles versus time. In these examples, the mobile stations 1104, 1106, and 1108 are operating at the same frequency as the master mobile, mobile station 1102, which is in this example 916 MHz. In FIG. 13, mobile station 1104 (i.e., unit 2) transmits at time equals 344 μsecs for 1281 μsecs 1302. Mobile station 1106 (i.e., unit 3) is received at time equals 1859 μsecs for 1391 μsecs 1304, mobile station 1108 (i.e., unit 4) is received at time equals 3484 μsecs for 1391 μsecs 1306, and mobile station 1102 (i.e., unit 1) is received at time equals 5859 μsecs for 1391 μsecs 1308.

Figure 14:
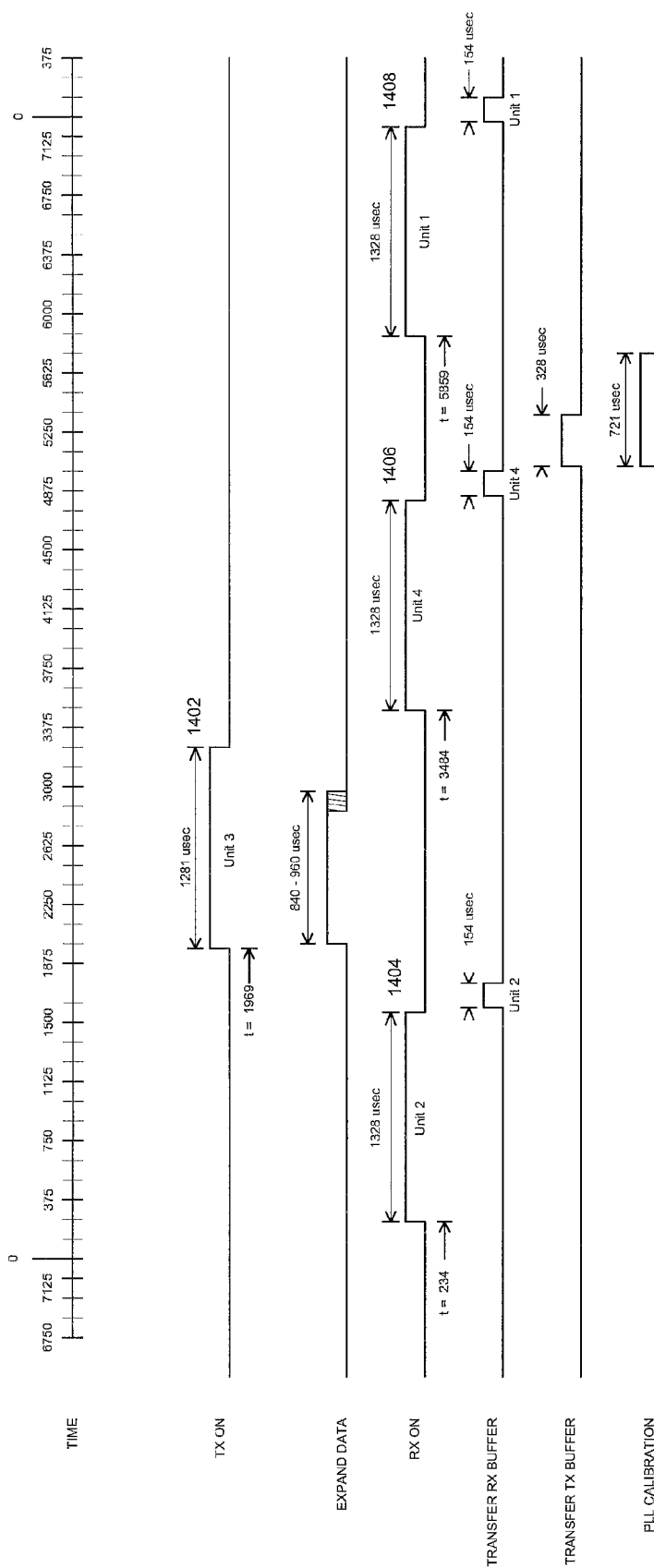
FIG. 14 shows a timing diagram for an example of another implementation of the operation of a mobile station acting as a slave mobile with respect to mobile station shown in FIG. 12.
Figure 15:
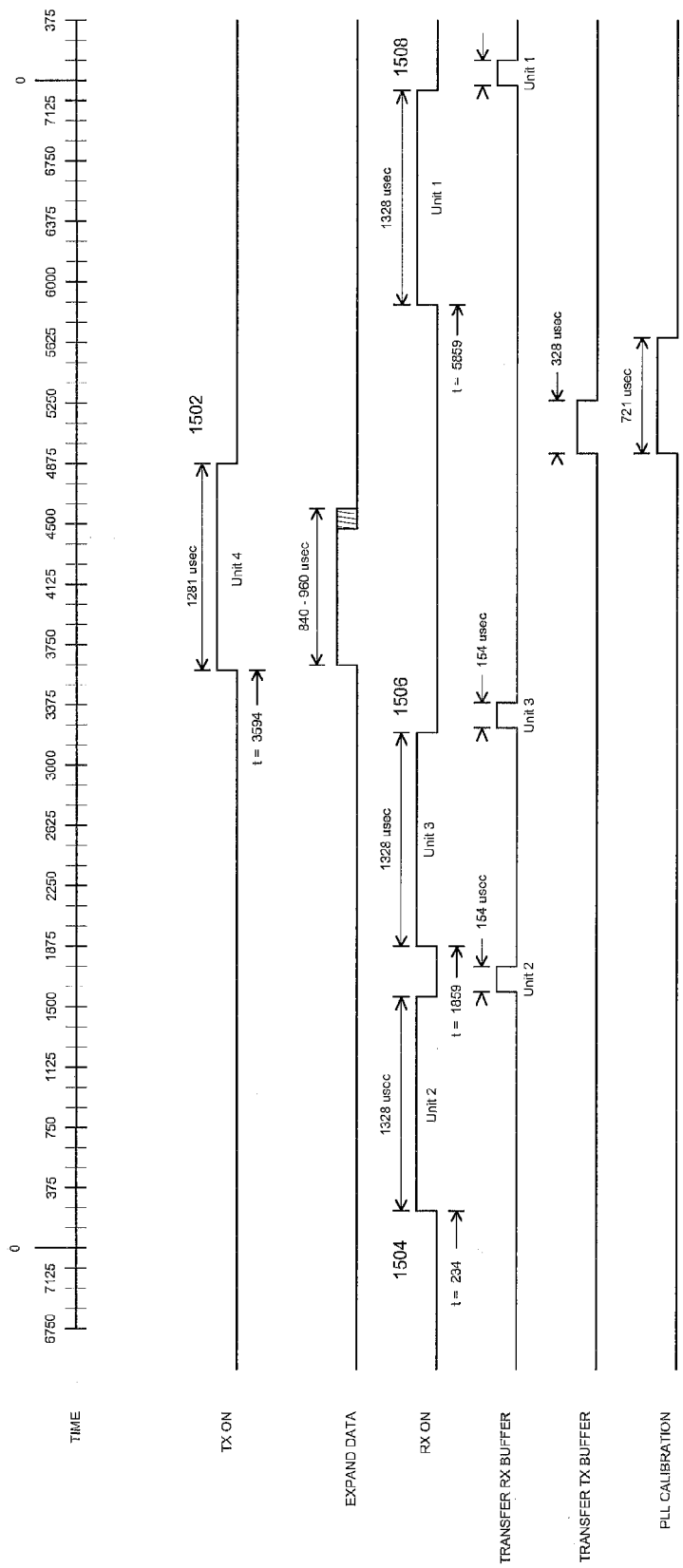
FIG. 15 shows yet another timing diagram for an example of an implementation of the operation of a mobile station acting as a slave mobile with respect to mobile station shown in FIG. 12.

In FIG. 14, mobile station 1106 (i.e., unit 3) transmits at time equals 1969 μsecs for 1281 μsecs 1402. Mobile station 1104 (i.e., unit 2) is received at time equals 234 μsecs for 1328 μsecs 1404, mobile station 1108 (i.e., unit 4) is received at time equals 3484 μsecs for 1328 μsecs 1406, and mobile station 1102 (i.e., unit 1) is received at time equals 5859 μsecs for 1328 μsecs 1408. In FIG. 15, mobile station 1108 (i.e., unit 4) transmits at time equals 3594 μsecs for 1281 μsecs 1502. Mobile station 1104 (i.e., unit 2) is received at time equals 234 μsecs for 1328 μsecs 1504, mobile station 1106 (i.e., unit 3) is received at time equals 1859 μsecs for 1328 μsecs 1506, and mobile station 1102 (i.e., unit 1) is received at time equals 5859 μsecs for 1328 μsecs 1508.

Moreover, it will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed:

1. A mobile unit for communicating with other mobile units assigned to a group within a Multipoint Voice Network ("MVN") having a plurality of groups, the mobile unit comprising:
   a time division multiple access ("TDMA") transmitter enabled to transmit on a set of multiple carrier frequencies, wherein the TDMA transmitter is configured to transmit on one frequency chosen from a selected sub-set of multiple carrier frequencies from the set of multiple carrier frequencies, wherein the one frequency chosen from the selected sub-set of multiple carrier frequencies corresponds to frequencies assigned to the group, wherein the TDMA transmitter is also configured to transmit utilizing a TDMA format that divides the transmitted data into multiple time slots, one time slot of the multiple time slots being configured for the TDMA transmitter;
   a TDMA receiver configured to receive and demodulate the selected sub-set of multiple carrier frequencies other than the frequency chosen for transmission by the TDMA transmitter; and
   a controller in signal communication with the TDMA receiver, wherein the controller selects the selected sub-set of multiple carrier frequencies and configures the TDMA receiver to receive and demodulate the selected sub-set of multiple carrier frequencies assigned to the group other than the frequency chosen for transmission by the TDMA transmitter.

2. The mobile unit of claim 1, wherein the TDMA receiver includes an Radio Frequency ("RF") stage and an Intermediate Frequency ("IF") stage.

3. A method for communicating between mobile units assigned to a group within a Multipoint Voice Network ("MVN") having a plurality of groups, the method comprising:
   setting a time division multiple access ("TDMA") of a mobile unit transmitter to transmit on a set of multiple carrier frequencies, wherein the TDMA transmitter is configured to transmit on one frequency chosen from a selected sub-set of multiple carrier frequencies from the set of multiple carrier frequencies, wherein the one frequency chosen from the selected sub-set of multiple carrier frequencies corresponds to frequencies assigned to the group;

setting a TDMA receiver of the mobile unit to receive and demodulate the frequencies of the selected sub-set of multiple carrier frequencies other than the one frequency chosen from the selected sub-set of multiple carrier frequencies for transmitting by the TDMA transmitter; and configuring the TDMA receiver to receive and demodulate the frequencies of the selected sub-set of multiple carrier frequencies other than the one frequency chosen from the sub-set of multiple carrier frequencies for transmitting by the TDMA transmitter.

4. The method of claim 3, wherein setting the TDMA receiver to receive and demodulate the frequencies of the selected sub-set of multiple carrier frequencies other than the one frequency chosen from the sub-set of multiple carrier frequencies for transmitting by the TDMA transmitter includes predetermining the one frequency chosen from the selected sub-set of multiple carrier frequencies corresponding to the group.

5. The method of claim 4, wherein setting the TDMA transmitter to transmit one frequency chosen from the selected sub-set of multiple carrier frequencies includes predetermining the one frequency chosen from the selected sub-set of multiple carrier frequencies.

6. The method of claim 3, wherein setting the TDMA transmitter to transmit includes utilizing TDMA techniques.

7. The method of claim 3, wherein setting the TDMA receiver to receive includes utilizing TDMA techniques.

8. The method of claim 6, wherein the TDMA techniques include setting the TDMA transmitter to transmit on one and only one time slot of the one frequency chosen from the selected sub-set of multiple carrier frequencies.

9. The method of claim 8, wherein the TDMA techniques further include utilizing a switch to set the time slot of the TDMA transmitter utilized for transmitting.

10. The method of claim 8, wherein the TDMA techniques includes setting the TDMA receiver to receive on all time slots of the one frequency chosen from the selected sub-set of multiple carrier frequencies other than the time slot chosen for transmitting the one frequency by the TDMA transmitter.

11. The method of claim 10, wherein the TDMA techniques further include utilizing a switch to set the time slots of the TDMA receiver utilized for receiving and demodulating the one frequency chosen.

12. The mobile unit of claim 1, wherein the TDMA transmitter is configured to transmit on one and only one time slot of the one frequency chosen from the selected sub-set of multiple carrier frequencies.

13. The mobile unit of claim 12, wherein the TDMA receiver is configured to receive on all time slots of the one frequency chosen from the selected sub-set of multiple carrier frequencies other than the one and only one time slot chosen for transmitting by the TDMA transmitter.

* * * * *